United States Patent [19]

Morrill

[11] 3,860,795

[45] Jan. 14, 1975

[54] PROGRAMMING GUIDE

[75] Inventor: Russell C. Morrill, Sylmar, Calif.

[73] Assignee: Morworth Enterprises, Inc., Van Nuys, Calif.

[22] Filed: Apr. 16, 1973

[21] Appl. No.: 351,182

[52] U.S. Cl. .............................. 235/61.12 N, 35/54

[51] Int. Cl. .......................................... G06k 19/00

[58] Field of Search 235/61.11 R, 61.11 A, 61.11 E, 235/61.12 N, 61.12 R; 35/48, 27, 37, 44, 54, 35/62

[56] References Cited

UNITED STATES PATENTS

| | | | |
|---|---|---|---|
| 2,497,200 | 2/1950 | Appel | 35/48 A |
| 3,476,917 | 11/1969 | Trebotich | 235/61.11 A |
| 3,610,893 | 10/1971 | Clark et al. | 235/61.12 R |
| 3,639,732 | 2/1972 | Crain et al. | 235/61.12 N |
| 3,741,471 | 6/1973 | Mani | 235/61.12 R |

*Primary Examiner*—Daryl W. Cook
*Attorney, Agent, or Firm*—Lyon and Lyon

[57] ABSTRACT

A guide for aiding a person unskilled as a programmer to convert information displayed in a preselected matrix into a form which is acceptable to a computer. The guide sets forth pertinent computer language and instructions necessary for the introduction of specific classes of data into an accompanying program without prior computer training of the operator. The classes of data to be introduced under specific instructions on the guide are determined for the operator by the location of the data in the preselected matrix.

6 Claims, 2 Drawing Figures

PROGRAMMING GUIDE

This invention is directed to means for feeding information to a computer. More specifically, this invention is directed to a device which allows an unskilled individual to translate data into a form acceptable to a computer.

As modern society continues to advance both in technical achievement and population, more and more business and scientific information is being stored in computers and associated hardware. This information is generally taken from a source which is not directly compatible with the selected computer. As a result, a skilled operator is needed to translate or rearrange the information or data into a language or arrangement which can be used by the computer. Following this skilled translation the translated material must then be placed in a physical form which is acceptable to the computer. Such physical forms as tapes, punch cards, magnetic printings and the like are normally required. Consequently, a two-step process has been needed to prepare data for introduction into a computer system. This two-step operation may be accomplished by a single skilled programmer who understands the program into which the data is to be filed and the language necessary to properly prepare the data. However, when substantial amounts of information are to be translated, it is more economical to hire a second individual not skilled as a programmer to take the translated data and place it in the proper physical form. One such class of operators not skilled as programmers which has developed because of this growing demand for translated data is the class of key punch operators. However, a programmer or other individual familiar with programming techniques for a specific program is still required to translate the data into statements acceptable to the specific program in question.

The present invention contemplates the use of a device which replaces the programming skill necessary for translating the raw data into a language and arrangement acceptable to computer systems. The programmer is only needed to establish the appropriate guide for the specific data matrix, program and computer. Consequently, an individual unskilled at programming may take raw data placed in a preselected matrix such as a business form and directly translate that data into a language, arrangement and physical form which is acceptable to a computer system.

Accordingly, it is an object of the present invention to provide a means for eliminating the need for a skilled programmer in the translation of data to a language and physical form acceptable to a computer.

A second object of the present invention is to provide a device which allows an unskilled operator to translate specifically arranged data into a series of statements acceptable to a computer.

Another object of the present invention is to provide a device which can be superimposed on prearranged data matrices and which teaches an individual, unskilled in computer programming or not familiar with the individual program, how to use that program.

A further object of the present invention is to provide a means for storing instructions on specific programs for use with prearranged data matrices to teach an operator how to load data into a specific program.

Further objects and advantages of the present invention will become readily apparent from the following detailed description and accompanying drawings.

Figure 1:
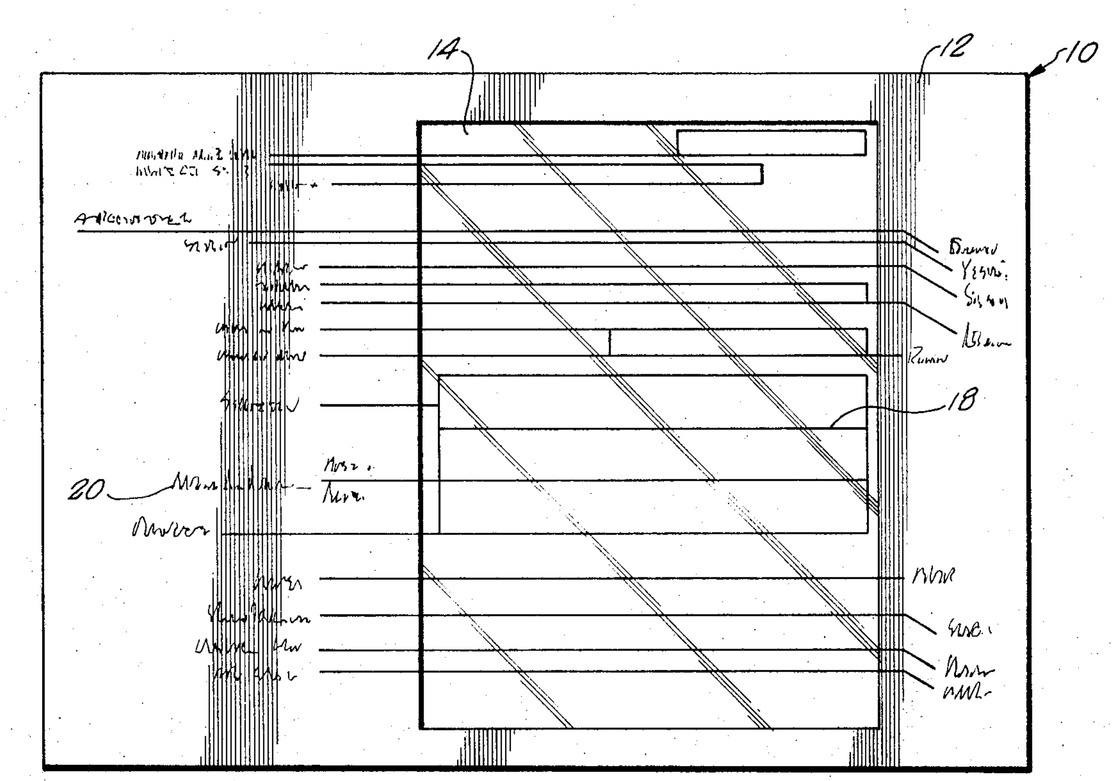
FIG. 1 is a plan view of the business form programming guide.

Turning specifically to the drawings, FIG. 1 illustrates a preferred embodiment of the present invention. The guide generally designated 10 is composed of an instruction section 12 and a data receiving section 14. The instruction section 12 and the data receiving section 14 are assembled to form a flat guide member. Te instruction section 12 is shown in this embodiment to be an opaque sheet. The data receiving section 14 is a transparent sheet.

Figure 2:
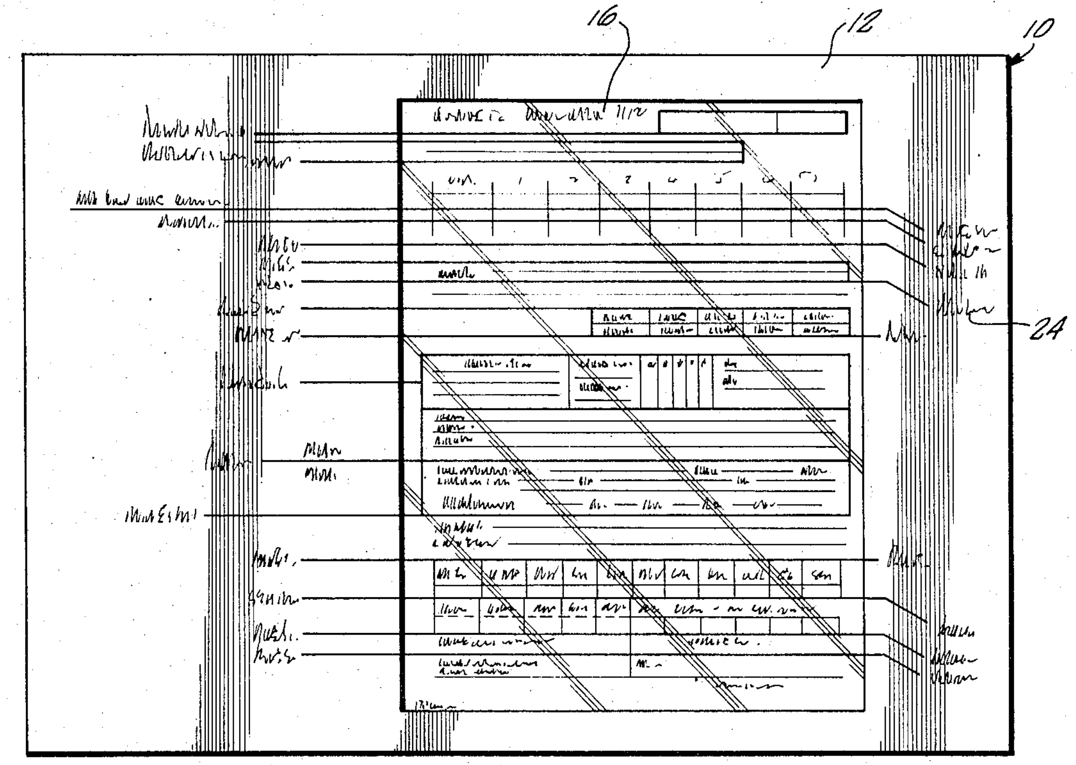
FIG. 2 is a plan view of the guide with a data matrix in place with the guide.

The transparent sheet 14 is large enough to display all of the data on the data matrix which is to be translated into language acceptable to a computer. The guide 10 is positioned over such a data matrix which can be seen through the transparent sheet 14. FIG. 2 illustrates the guide 10 in position over a data matrix which, in this instance, is a business form 16.

The data matrices 16 employed with the guide 10 preferably have a flat or substantially flat display surface. Such matrices may be provided on business forms, organized engineering data books, computer output matrices, cathode ray tubes, films, diagrams, or punched cards. Naturally, this listing of the forms of data matrices which may be employed by the present invention is only a small segment of the possible arranged marices which may be employed with the present system. The above list merely illustrates the scope of forms in which the desired data may exist.

To properly reference the discrete data points, lines 18 may be drawn across both the opaque sheet 12 and the transparent sheet 14. Associated with lines 18 are instructions 20. Instructions 20 may consist of key computer language statements referencing specific data points in the program to be directly copied by the operator. Lines 18 and instructions 20 must be specifically designed for the data matrix and associated computer program which are to be used. The instructions 20 may refer to specific data storage points in the computer program for data which is specifically indicated by one or more of lines 18. Instructions 20 may be found both to the left and to the right of the transparent sheet 14. The instructions 20 to the left may be employed to reference specific data points within a class of data. Consequently, where several lines of data refer to succeeding data positions and are all of the same class, the instructions to the left may be repeated with each succeeding entry. Such a condition is suggested at a point indicated as 22 on FIG. 2. If the instructions 20 to the left are so used, the instructions 20 to the right may be used at the conclusion of the several data entries within a specific class.

Such a condition is suggested at point 24 on FIG. 2. Naturally, other similar systems may be employed to accommodate specific data matrix arrangements. It is also possible to place instructions 20 on the transparent sheet 14 where such would be helpful.

Other forms of the present invention may include a totally transparent sheet comprising the guide 10. In such an instance, the opaque sheet 12 and the transparent sheet 14 would be a single piece of construction. If such a transparent arrangement is employed, guide lines would be required to properly position the data matrix beneath the guide 10. In the embodiment illustrated in the drawing, the edge of the transparent sheet 14 may correspond to some margin or reference on the data matrix. Guide lines for positioning the data matrix beneath the present system may be included where convenient.

The uses to which the present device may be put to reduce the need for technical programming personal also apply to saving the time of technical personal when they use the present guide. The guide 10 may be used as a means for altering the instructions by hand written notes during the development of a program. Further, the guide provides a memory aid and can be used by an individual who is capable of figuring out the program but who has not recently used the program or has assumed the programming task from another.

Thus, a helpful guide means is provided which aids individuals both skilled an unskilled at programming. While embodiments and applications of this invention have been shown and described, it would be apparent to those skilled in the art that many more modifications are possible without departing from the inventive concepts herein described. The invention, therefore, is not to be restricted except as is necessary by the prior art and by the spirit of the appended claims.

I claim:

1. A guide for aiding in the translation of data to a form acceptable to computers, comprising a data receiving section adapted to receive data arranged in predetermined matrices separate from said guide;

an instruction section, said instruction section being in predeterined relationship with said data receiving section in order that said instruction section may be aligned with data received by said data receiving section, said instruction section including predetermined statements arranged to provide a direct reading of the separate, aligned data in a form acceptable to a computer.

2. The device of claim 1 wherein said guide is a flat sheet.

3. The device of claim 1 wherein said data receiving section is a substantially clear sheet sized to expose the preselected data matrices.

4. The device of claim 1 wherein said instruction section includes opaque sheet material having printed indicia thereon.

5. The device of claim 4 wherein said instruction section further includes guide lines associating said printed indicia with positions on said data receiving section.

6. A guide for aiding in the translation of data into a form acceptable to computers, comprising a sheet having a first section, said first section being substantially transparent, and a second section, said second section being opaque;

printed indicia located on said second section, said printed indicia including predetermined statements used to input data into a computer program; and guide lines for tying segments of said printed indicia to positions on said first section, said positions being located on said first section to cooperate with data arranged in a predetermined matrices separate from said guide, said printed indicia thereby providing for a direct reading of the separate, data arranged in the predetermined matrices in a form acceptable to a computer.

* * * * *